Jan. 4, 1966

G. O. MAKIN 3,227,464

PACKING SEAL FOR SHAFTING

Filed July 2, 1965

INVENTOR.
GLENN O. MAKIN
BY

United States Patent Office 3,227,464
Patented Jan. 4, 1966

3,227,464
PACKING SEAL FOR SHAFTING
Glenn O. Makin, 3132 Northway Drive, Baltimore, Md.
Filed July 2, 1965, Ser. No. 469,105
2 Claims. (Cl. 277—105)

This invention relates to a packing assembly, and more particularly to a packing for packing valve stems, piston rods, rotary pump shafts or the like, positioned within a stuffing box, and is a continuation in part of my patent application Serial No. 280,065, filed May 13, 1963, now abandoned, which in turn is a continuation of my patent application Serial No. 53,733, filed September 2, 1960, also abandoned.

The present arrangement is designed for more efficiently sealing the opening in a pressure carrying fixture or apparatus through which a valve stem, piston rod or rotatable shaft extends.

The primary object of the invention is to provide a packing which includes two oppositely disposed substantially rigid contractable and expandable packing rings, which are sometimes referred to as compression rings, which are preferably made of metal having a central opening therein adapted to be slidably receivable about the valve stem, shaft or the like, and having a diagonal slot therethrough, each ring being provided with a flat face perpendicular to one end of the opening and an inclined, or beveled, face extending from the opposite end of the opening to the outer edge of the flat face. The inclined faces of the rings are positioned to face each other and are adapted to receive therebetween a pliable compressible packing ring of suitable packing material.

Another object of the invention is to provide the inclined face of each of the rigid rings with approximately a 45 degree angle.

Still another object of the invention is to provide a rigid packing ring that will increase the pressure of the pliable compressible packing against the inner surface of the packing box.

Still another object of the invention is to provide a pliable compressible packing of such form as to present to the inner surface of the packing box a greater surface than it does to the valve stem, shaft, etc.

A further object of the invention is to provide a contractible rigid packing ring at each side of the flexible compressible packing for presenting a maximum outward thrust against the compressible packing toward the inner surface of the packing box and a minimum pressure against the valve stem, shaft, etc., and at the same time provide means of keeping an even pressure on the flexible compressible packing ring.

A further object of the invention is to provide the contractible rigid packing rings with such spring action from their contraction as to provide constant pressure on the compressible packing by the expanding force set up when the rigid rings are contracted under pressure.

These and other objects of the invention will become more apparent from a reading of the following specification and claims, taken with the accompanying drawings, wherein like parts are referred to and indicated by like reference characters throughout the several views, in which:

Figure 1:
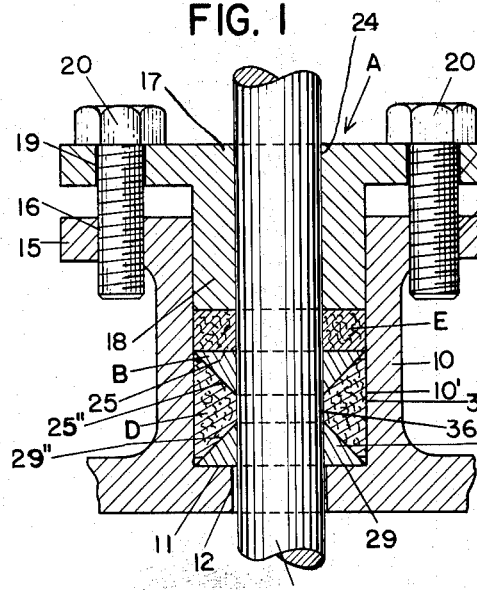
FIGURE 1 is a sectional view taken through the packing or stuffing box illustrating the utilizing of the rigid contractible rings of the present invention and showing the position of the several parts after the gland has been tightened.

Referring in detail to the drawings, and in particular to FIGURES 1, 2, 4, 5, and 6, A indicates a fixture in the form of a packing box and a packing assembly according to the present invention, and the numeral 10 indicates the stuffing or packing box which includes a space for the packing assembly and the usual end wall 11 which forms a shoulder for the packing and an aperture or opening 12 therein for receiving a stem or shaft member 13. The stuffing or packing box includes an inner side wall portion 10' and a flange 15 adjacent its outer end which has a pair of apertures 16 therethrough. Extending over the flange 15 is a gland 17 including apertures or openings 19 therein that register with the apertures in the flange 15. The gland is adjustably secured to the flange 15 by bolts or screws 20 which are adapted to extend through the apertures 19 and into engagement with the apertures 16 so that by adjusting the securing elements 20, the gland 17 may be moved relative to the flange 15. The gland is provided with a cylindrical portion 18 adapted to be slidably receivable into the space provided for the packing and a central opening 24 for receiving the stem or shaft member 13.

The letter B indicates one of the rigid contractible compression rings which has a flat surface 25 extending outwardly from one edge of a central opening 25' and is perpendicular with the axis of the said opening. The rigid contractible ring is also provided with an inclined surface 25" preferably of an angle approximately 45 degrees with respect to the longitudinal axis of the said opening 25' and exteneds diagonally from the opposite edge of the surface of the central opening to the outer edge of the flat surface 25.

The letter C indicates a second rigid contractible compression ring and when in use is spaced from the first rigid contractible ring B. This contractible rigid ring C is exactly like the ring B and is provired with a flat surface 29 and a central opening 29' slightly larger than the stem or shaft 13. The flat surface 29 extends perpendicular to one edge of the surface 29' of the central opening. Extending from the opposite end of the surface 29 of the central opening is an inclined surface 29" which is also formed at an angle of approximately 45 degrees with respect to the axis of the central opening 29' in which the inclined surface or face 29" extends toward the inner surface of the packing box and the inclined face 25" of the ring B. The ring C is provided with a diagonal slot 31, and the ring B is provided with a similar slot 32 for the purpose later to be described.

Figure 2:
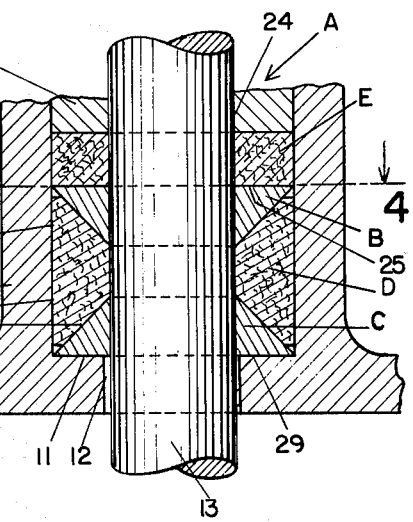
FIGURE 2 is an enlarged fragmentary sectional view similar to FIGURE 1, showing the position of the rigid contractible ring in relation to the stem or shaft before pressure is applied to the packing.

Positioned between the two rigid contractible rings B and C is a pliable compressible packing ring D adapted to circumimpose the stem or shaft 13 and preferably preformed with angled sides 33 and 34 to coincide with at least a portion of the inclined surfaces 25" and 29" of the ring members B and C. The outer surface 35 of the ring member D is substantially greater than the inner surface 36. In FIGURE 2 the parts are shown in position before the gland 17 is tightened, while in FIGURE 1, the parts are shown in their position after pressure has been applied to the packing by the gland 17. Extending between the flat surface 25 of the rigid contractible ring B is a resilient cushioning ring E. This cushioning ring equalizes the pressure on the flat surface 25 of the ring B and prevents cocking of the ring B should the gland portion 18 be slightly uneven, or not drawn down evenly by the gland securing elements 20.

It will be seen that the angled surfaces 25" and 29" of the rigid rings B and C will compress the pliable packing ring D so that the larger area of the outer surface of the packing ring D will be pushed outwardly and tightly against the inner surface 10' of the wall 10 as this is the most vulnerable area for leakage partly because these inner surfaces of the packing box are seldom evenly formed or smoothly finished.

The rigid contractable rings B and C are of substantial thickness. They are preferably at least as thick as the width of the flat surfaces 25 and 29. This depth helps keep the rigid rings in alignment with the elongated axis of the stem or shaft about which they are positioned.

The slots 31 and 32 in the contractable rings B and C are for allowing for the contracting of the rings under pressure as may be necessary in their operation and use. The rings are made with a five-thousandth clearance more or less over the stem or shaft about which they are positioned. When the pliable packing ring D is compressed, these rings will, by the angle of their inclined edge, be urged toward the stem or shaft to a lesser tolerance of clearance between the stem or shaft and the ring openings, but not to the point where they will overengage the shaft. The slots in these contractible rings are comparable with the difference between the size of the openings and the outside diameter of the shaft, so that the sides of the slots will be abutted when fully contracted to always insure the shaft a slidable fit with the rings.

The contractible rigid rings B and C, as mentioned hereinbefore, fit the stem or rod quite closely, and in so doing they will keep the stem or rod clear from any buildup of deposits that may tend to adhere to them and allow free and easy operation of the stem or rod as the case may be. Also, the packing rings B and C will act as an auxiliary bearing on the outer end of a rotatable shaft.

The packing parts may be made of any suitable material and in different sizes. However, the rigid rings B and C are preferably made of a noncorrosive material, such as stainless steel, and of a material that will be suitable to their use. The packing or sealing ring D is preferably made of a pliable compressible material, or other suitable packing material.

In assembling the packing members, the contractible packing ring C is placed over the stem or shaft with its flat side adjacent the shoulder 11 at the bottom of the packing box and with its beveled surface 29 extending upwardly and angled outwardly toward the inner surface of the packing box. Then the ring D, preferably of pliable compressible packing material, is placed over the stem or shaft 13. The rigid ring B is then placed over the stem or shaft 13 with its angled surface 25" positioned toward the compressible packing material D and with its flat side 25 positioned toward the gland 17. The pliable compressible packing ring D is shown as having its two sides partly formed to coincide with the inclined surfaces of the rigid rings B and C. However, it may take any convenient form, that is it may be formed to coincide with the inclined surface of the rings B and C through its entire area, or the pliable compression ring D may be formed with flat parallel sides whereby the ring may be pressed into the form as shown in FIGURE 1 by the angled surface to the rigid ring members B and C. The packing D is pressed with substantial force toward the inner surface 10' of the packing box where the leak generally occurs, with a minimum pressure on the stem or shaft for the reason that the stem or shaft generally has a polished surface and leakage occurs less often between this type surface and the packing than it does between an unpolished surface and the packing ring.

This packing assembly has proven very successful and has been adapted by several large companies using high pressures of both steam and hydraulic fluids. Valves packed with the combination pliable compressible packing between rigid contractable compression rings of the present invention will remain tight after long periods of operation. This is due primarily to the low area of friction between the friction area of the pliable compressible packing ring D and the stem or shaft 13.

While the angle of the faces 25" and 29" of the contractable rigid compression members 25 and 29 are shown and described to be at an angle of approximately 45 degress, they may be of any convenient angle that will produce the desirable thrust to the compression ring D.

The rigid rings are of continuous circular construction except for the diagonal slots 31 and 32 which give them a slight degree of contraction when they are under compression placed upon them by the gland member 17.

Figure 3:
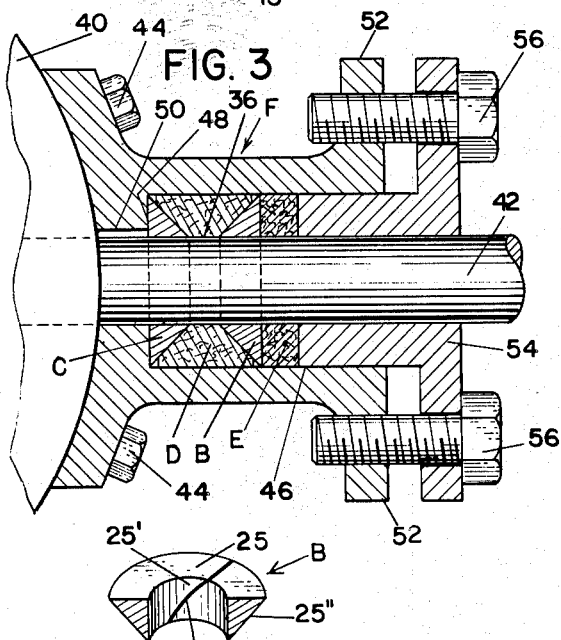
FIGURE 3 is a fragmentary sectional view of the improved packing assembly as applied to a rotatable shaft.
Figure 4:
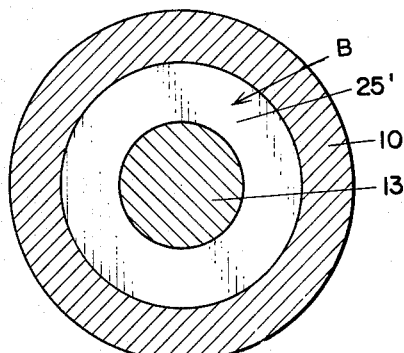
FIGURE 4 is a sectional view taken on the line 4—4 of FIGURE 2.
Figure 6:
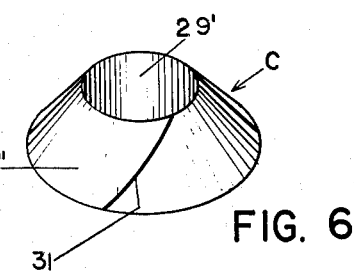
FIGURE 6 is a perspective view in elevation of one of the rigid contractible rings.
Figure 5:
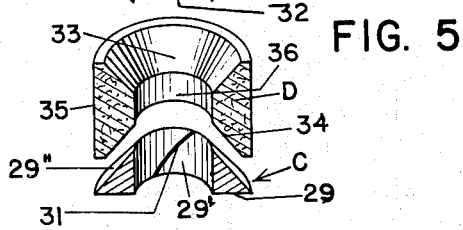
FIGURE 5 is a sectional perspective exploded view illustrating certain constructional details of both the rigid contractible rings and the pliable compressor ring positioned between the two rigid rings.

In FIGURE 3, the use of the packing assembly is shown in use with a rotating shaft such as is used in a rotary pump. In instances where the parts are identical with the parts designated in FIGURES 1, 2, 4, 5, and 6, the same reference numerals are used to prevent repetition. The pump housing is illustrated fragmentarily by the numeral 40. Extending through the pump housing 40 is a shaft 42, and about the shaft and secured to the housing is a packaging or stuffing box F. The packing box F may be a part of the pump housing, or it may be secured to the housing by suitable fastening means, such as the bolts 44. The packing for the packing box E is provided with a cylindrical opening 46 to provide a space for the packing assembly which is the same used and described in the first form. At the inner end of the opening 40 is a shoulder 48 and an opening 50 for allowing the passage of the shaft 42 into the pump housing. The packing assembly comprises the same elements B, C and D and the equalizing element E.

The packing box F is provided with a flange 32 similar to the flange 15, and a gland 54 similar to the gland 17, which is adjustably secured to the flange 52 by bolts 56. The operation of the packing assembly is substantially the same as previously disclosed for the form shown in the remaining figures.

The present packing assembly may be used for sealing most types of valve stems, reciprocating piston rods, rotary shafts for pumps, compressors and the like.

While the disclosure shows the use of a gland 17 having bolts 20 for placing pressure on the packing, a threaded bushing type element adapted to be threaded into the housing 10 may be used, which is quite common on certain small types of valve stems and shafts.

It will, of course, be understood that various changes may be made in the form of detailed arrangement and proportions of the parts without departing from the scope of the invention which is set forth in the appended claims.

I claim:

1. A combination packing and stuffing box wherein the stuffing box includes a cylinder having an inner surface of predetermined size for receiving a set of two spaced rigid one piece spring-like slotted contractible compressing rings wherein the slots are normally open and an intermediate pliable compressible and expandable packing ring, a shoulder at the lower inner edge of the cylindrical surface in a plane perpendicular to the longitudinal axis of the cylinder and provided with an opening centrally thereof for receiving a cylindrical stem like shaft, said opening in the rigid rings being normally of a slightly greater diameter than the diameter of the shaft when the said slots are in open position, and of substantially the same diameter as the stem-like shaft when the slots are closed, said contractible rigid compressing rings being triangular in cross-section with each ring having a side wall slidably engageable with said cylindrical stem-like shaft and a wall having one edge positioned adjacent one edge of the first mentioned side wall and at right angles thereto and an angled wall extending from and between the opposite edges of each of said side walls, said pliable compressible and expandable packing ring being disposed between the surfaces of the angled walls of said rigid contractible compressing rings with a major outer peripheral side in sealing engagement with the cylindrical inner surface of the said stuffing box, and a minor inner peripheral side engaging said cylindrical shaft and means for axially compressing said compressible and expandable ring between said spaced contractible compressing rings for providing a tighter seal between the surface of said cylinder and the adjacent wider surface of said compressible and expandable ring than between the cylindrical shaft and the inner narrower peripheral surface of said compressible and expandable packing ring, the spring action of the two compression rings being such as to contract under a predetermined pressure toward the shaft and expand against the compressible packing ring for retaining the same under constant pressure in sealed engagement with the said stuffing box and said shaft.

2. In a combination packing and stuffing box as claimed in claim 1 wherein a flexible compensating member is positioned between the upper face of the upper slotted resilient compressing ring and the axially compressing means.

References Cited by the Examiner
UNITED STATES PATENTS

| | | | |
|---|---|---|---|
| 851,746 | 4/1907 | Hageman | 277—32 |
| 1,180,211 | 4/1916 | Throp et al. | 277—115 |
| 1,505,462 | 8/1924 | Hillman | 277—125 |
| 1,787,020 | 12/1930 | Sautter | 277—120 |

LAVERNE D. GEIGER, *Primary Examiner.*